United States Patent [19]

Nomura

[11] 4,291,944
[45] Sep. 29, 1981

[54] AUXILIARY CYLINDER FOR CAMERA

[75] Inventor: Hidetuka Nomura, Tokyo, Japan

[73] Assignee: Hideji Sato, Tokyo, Japan

[21] Appl. No.: 760

[22] Filed: Jan. 2, 1979

[30] Foreign Application Priority Data

Apr. 28, 1978 [JP] Japan .................. 53-58444[U]

[51] Int. Cl.³ .............................. G02B 7/02
[52] U.S. Cl. .................................... 350/257
[58] Field of Search ................ 350/235–257, 350/183, 175 TS; 354/286, 197; 403/349

[56] References Cited

U.S. PATENT DOCUMENTS

| | | | |
|---|---|---|---|
| 993,121 | 5/1911 | Stone et al. | 403/349 |
| 1,687,818 | 10/1928 | Wollensak | 350/257 |
| 2,008,991 | 7/1935 | Nowack | 350/257 |
| 2,496,928 | 2/1950 | Bing et al. | 350/252 |
| 2,853,925 | 9/1958 | Lee | 350/252 |
| 2,902,901 | 9/1959 | Back | 354/197 |

FOREIGN PATENT DOCUMENTS 701561 3/1931 France .................. 350/255
18121 of 1907 United Kingdom ........ 350/183
1194047 6/1970 United Kingdom ........ 403/349

OTHER PUBLICATIONS

Jones, L. E., "Use of Supplementary Lenses", Photo Technique 2-1941, pp. 46–49.

Primary Examiner—William H. Punter
Attorney, Agent, or Firm—Wenderoth, Lind & Ponack

[57] ABSTRACT

An auxiliary lens holding cylinder has a main cylinder having a lens holder on one end and a camera mounting fixture on the other end and a sub-cylinder having a built-in lens for one of a variety of types of photography is coaxially removably mounted in the main cylinder. The built-in lens can be a plus type lens or a minus type lens. The main cylinder has a sub-cylinder holder mounted therein coaxial with the main cylinder, and guiding and locking grooves in the holder cooperating with a boss on the sub-cylinder for guiding the sub-cylinder into the holder and locking the sub-cylinder in the holder. A spring on the main cylinder urges the sub-cylinder into locking engagement with the guiding and locking grooves.

7 Claims, 3 Drawing Figures

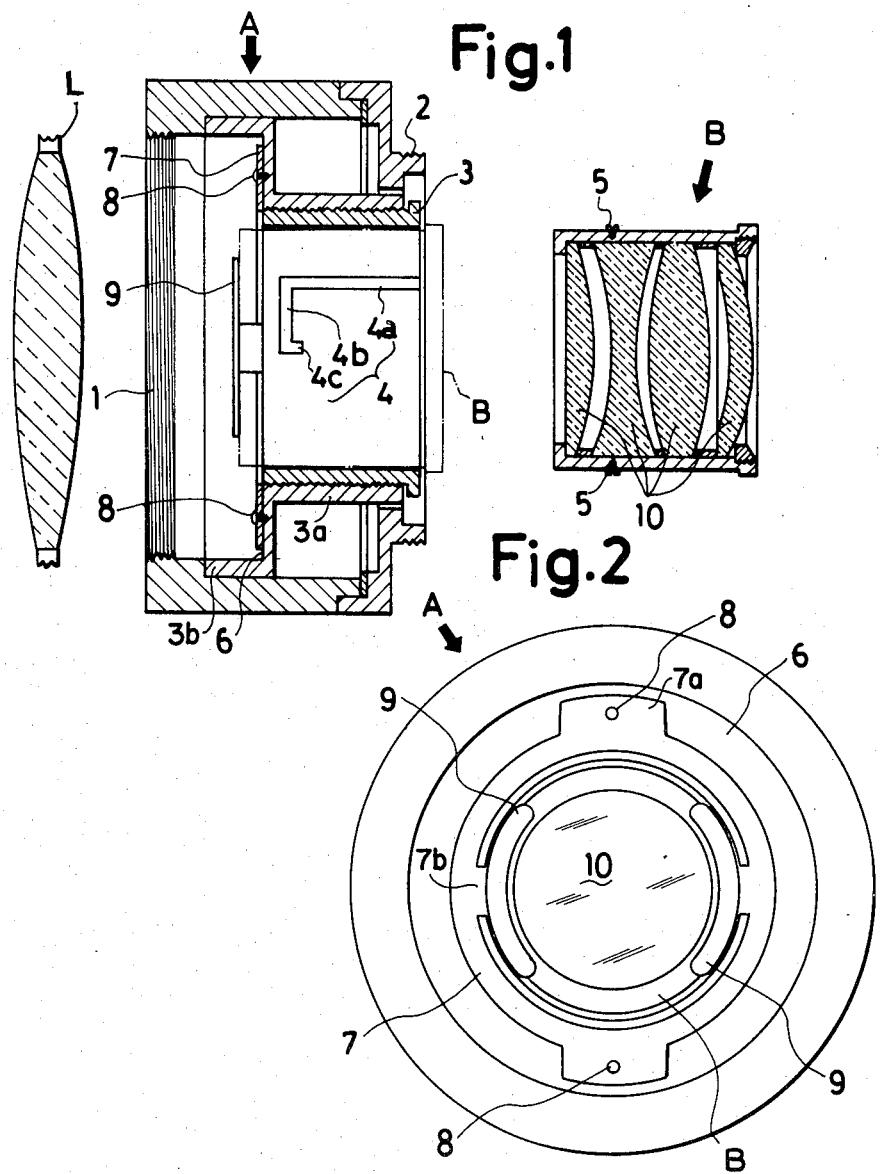

AUXILIARY CYLINDER FOR CAMERA

The present invention relates to an auxiliary lens holding cylinder for a camera consisting of a main cylinder with a lens holder on one end and a camera body mounting structure on the other end, and a sub-cylinder having a plus- or minus lens and which is removably mounted in the auxiliary cylinder, said auxiliary cylinder being mounted on the camera body with an appropriate lens thereon for the purpose of wide-angle, long-range or close-range photography.

BACKGROUND AND PRIOR ART

Three types of auxiliary lens holding cylinders are known which are used for wide-angle, long-range and close-range photography, respectively, and these cylinders are mounted on the camera body with a lens of an appropriate focal length therein One type has in addition to the appropriate focal length lens a built-in plus lens fixed therein, one has a built-in minus lens fixed therein, and one has no built-in lens. They are generally referred to simply as a "lens" with a designation of the focal length of the combination of the appropriate lens and the built-in lens, if any.

Appropriate ones of these lens holding cylinders are selectively used for wide-angle, long-range or close-range photography. Thus all three types of cylinders must be available if all three types of photography are to carried out, and this is uneconomical and is also undesirable from the standpoint of convenience.

For this reason, a single auxiliary lens holding cylinder which can be used for all three types of photography, i.e., wide-angle, long-range and close-range, that is, one economical and portable auxiliary lens holding cylinder has long been in demand.

OBJECTS AND BRIEF SUMMARY OF THE INVENTION

One object of the present invention is to provide a single auxiliary lens holding cylinder which can be mounted on a lens mount on a camera body and carry the appropriate lens, and which is universally usable for holding lenses suitable for wide-angle, long-range and close-range photography.

Another object of the present invention is to provide such an auxiliary lens holding cylinder, which because it is the only one needed, can halve the cost of separate auxiliary cylinders for lenses for wide-angle, long-range and close-range photography.

Still another object of the present invention is to provide a single auxiliary lens holding cylinder the usefullness of which for wide-angle, long-range and close-range photography can reduce the weight and volume of materials to be carried by a photographer.

To attain these objects, the auxiliary lens holding cylinder according to the present invention consists of a main cylinder having a lens holder on one end and a camera body mounting structure on the other end and a sub-cylinder with a built-in plus-or-minus lens, which is removably mounted in said cylinder, said auxiliary lens holding cylinder being adapted to be mounted on the camera body with an appropriate lens thereon.

These and other objects and advantages of the present invention will become more apparent from the following detailed account of the invention taken with the accompanying drawings, in which:

BRIEF DESCRIPTION OF THE FIGURES

FIG. 1 is an axial section of one embodiment of an auxiliary lens holding cylinder for a camera according to the invention with the main cylinder and the sub-cylinder being separated;

FIG. 2 is a front view of the assembled auxiliary lens holding cylinder, viewed from the left in FIG. 1.

DETAILED DESCRIPTION OF THE PREFERRED EMBODIMENTS

Figure 3:
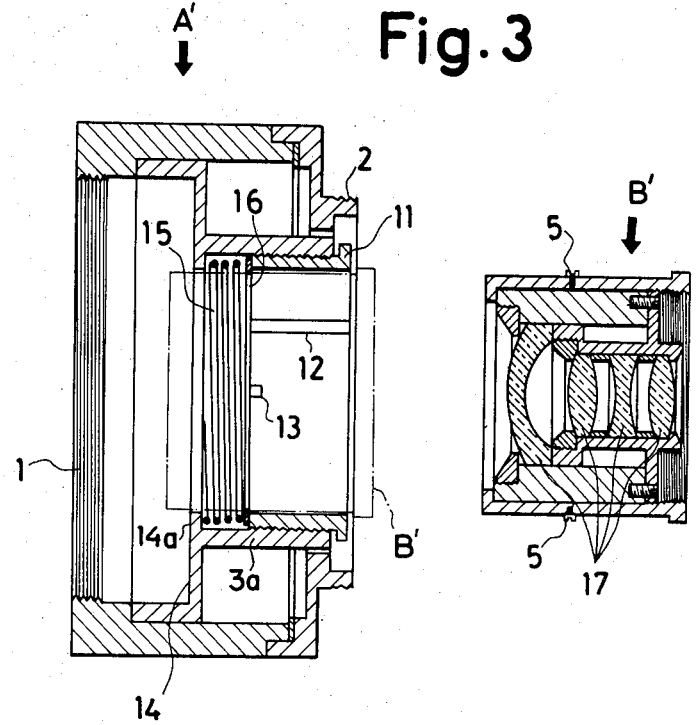
FIG. 3 is an axial section of another embodiment of an auxiliary lens holding cylinder according to the present invention with the main cylinder and the sub-cylinder being separated.

The auxiliary lens holding cylinder according to the present invention is broadly a combination of a main cylinder (A) and a sub-cylinder (B). On the front end of the main cylinder (A), i.e. the end remote from the camera, is a lens holder (1) into which an appropriate main photography lens shown schematically at L can be screwed; and on the other end is a mounting fixture (2) which is screwed into a lens mount on a camera body (not shown) for mounting the auxiliary cylinder on the camera.

In the first embodiment shown in FIGS. 1 and 2, a cylindrical holder (3) for holding the sub-cylinder (B) and guiding it into and out of the holder is coaxially mounted in the middle of the mounting fixture (2) in the main cylinder (A). Holder 3 is externally threaded and threadedly engaged in a coaxial sleeve 3a having a radially outwardly extending flange 6 on the front end thereof, and coaxial cylinderical portion 3b on the outer end of the flange 6. The coaxial cylindrical portion is fixed in the main cylinder A with the front end against the lens holder 1. In the internal wall of said holder (3) in diametrically opposite locations are straight grooves (4a) extending from the end toward the camera mounting fixture and parallel to the axis of the holder. Circumferential grooves (4b) extend from the inner ends of straight grooves (4a) for a short distance. At the extreme ends of the circular grooves (4b) are reentrant lock grooves (4c). Bosses (5) formed by the heads of screws on the sub-cylinder (B) engage in the grooves 4a, 4b and 4c for guiding the sub-cylinder into the holder and locking it and guiding the sub-cylinder (B) out of the holder.

On the front face of flange (6) inside of the cylinder (A) is mounted an annular leaf spring (7) having a slightly larger diameter than the outer diameter of said holder (3). Screws (8) in diametrically opposite ears 7a hold the spring 7 on the flange 6.

Extending inwardly from the inner circumference of leaf spring (7) at positions 90° from the ears 7a are projections 7b on the inner ends of which are mounted arc-shaped contact pieces (9) at positions in the path of the front face of the outer end of the sub-cylinder (B). The arc-shaped contact pieces (9) are contacted by the front end of the sub-cylinder (B) at a point at which said bosses (5) are still in straight grooves 4a before they reach the deepest position of the straight groove (4a), that is, before they reach the circumferential grooves (4b).

The sub-cylinder (B) is a cylinder having a slightly smaller diameter than the holder (3), and which holds a built-in plus or minus lens 10. The lens 10 shown in FIG. 1 is a minus lens for combining with an appropriate long-range lens for long-range photography.

The main cylinder (A) and the sub-cylinder (B) are assembled as follows. The bosses (5) on the sub-cylinder (B) are fitted into the straight grooves (4a) in the holder (3) of the main cylinder (A) and the sub-cylinder is moved to the left into the guide 3. The forward end of the sub-cylinder (B) comes into contact with the arc contact pieces (9) of the annular leaf spring (7) before the bosses (5) reach the circumferential grooves (4b). The sub-cylinder (B) is urged further into the guide 3 against the action of the leaf spring 7 until the bosses (5) reach the circumferential grooves (4b), the elasticity of the annular leaf spring (7) urging the sub-cylinder (B) back toward the camera mounting fixture (2). Then the sub-cylinder (B) is rotated to cause the bosses (5) to move along the circumferential grooves (4b) until the bosses reach the positions of the lock grooves (4c). The sub-cylinder B is then released, and the elasticity of the annular leaf spring (7) urges the sub-cylinder B to the rear toward the camera mounting fixture 2 and the bosses (5) of the sub-cylinder (8) move into the lock grooves (4c) and are locked therein.

When the sub-cylinder (B) is locked in the cylinder (A) with the bosses at the rear ends of locking grooves 4c, the lens (10) is set at a specified position in the cylinder (A).

The camera mounting fixture (2) is then mounted on the lens mount of a camera body, and an appropriate main photography lens is mounted in the lens holder (1). Where a minus lens (10) is built into the sub-cylinder (B), this lens together with the appropriate lens in the lens holder can make possible long-range photography. The magnification factor for the long-range photography can be freely selected by the combination of an appropriate minus lens (10) and an appropriate lens in the lens holder 1.

To remove the sub-cylinder (B) from the cylinder (A), the above procedure is reversed, namely, the sub-cylinder (B) is moved toward the lens holder (1) against the force of the annular leaf spring (7), and when the bosses (5) reach the circular grooves (4b), the sub-cylinder (B) has only to be rotated until the bosses (5) reach the position of the straight grooves (4a) after which the sub-cylinder is simply pulled out of the holder 3.

FIG. 3 illustrates another embodiment of the present invention which differs from the first embodiment in that the holder fixed within the main cylinder (A) is different and the annular leaf spring has been replaced by a coil spring. In both embodiments like reference numbers denote like parts.

The cylindrical holder 11 is coaxially mounted in the middle of the mounting fixture (2) in the main cylinder (A') being threaded into the cylindrical sleeve 3a. However, the holder 11 is shorter than the holder 3 of the first embodiment, and when it is fully inserted into the sleeve 3a the outer end is spaced from a shoulder 14a of the radial flange 14 on sleeve 3a.

On the diametrically opposite portions of the internal wall of said holder (11) are straight grooves (12) extending the entire length thereof and parallel to the axis of said holder 11.

At positions circumferentially spaced from these straight grooves 12 are small lock grooves (13) in the outer end of holder 11 in which the bosses (5) on the sub-cylinder (B') can be locked to prevent rotation of the holder (11). Between the outer end holder (11), and the shoulder 14a is a coil spring (15). Furthermore, between said coil spring (15) and the end of said holder (11) is a flat ring (16).

The sub-cylinder (B') is slightly smaller in diameter than the holder (11) and in this embodiment is shown as holding a built-in plus lens (17) for wide-angle photography.

To mount the sub-cylinder (B') in the cylinder (A') the sub-cylinder B' is inserted into the holder 11 with the bosses (5) in the straight grooves (12). Then the sub-cylinder (B') is pushed into the left in FIG. 3. When the bosses (5) engage the flat ring (16), the sub-cylinder is pushed a little farther, slightly compressing the coil spring (15). Then the sub-cylinder (B') is turned until the bosses (5) reach the positions of the lock grooves (13).

The sub-cylinder (B') is then released, and the force of the coil spring (15) causes the bosses (5) to engage in the lock grooves (13). Thus the sub-cylinder (B') is locked in position in the main cylinder (A').

Just as in the first embodiment, the position in which the sub-cylinder (B') is locked in the main cylinder (A') is such that the lens (17) is at a specified position in the main cylinder (A').

The auxiliary lens holding cylinder thus constituted can be mounted on the lens mount of a camera body by camera mounting fixture (2). A camera lens need not be mounted in lens holder 1. In this case, wide-angle photography can be carried out because the sub-cylinder (B') holds the built-in plus lens (17). The selection of the desired wide-angle is by selection of an appropriate plus lens (17), just as in the case of the magnification for the long-range photography in the first embodiment.

To remove the sub-cylinder (B') from the cylinder (A'), the above procedure is reversed, namely, the sub-cylinder (B') is pressed toward the lens holder (1) against the force of the coil spring (15) so that the bosses (5) are moved out of the lock grooves (13) between the end of the holder (11) and the flat ring (16), then the sub-cylinder (B') is turned until the bosses reach the positions of the straight grooves (12), where they will be urged into the straight grooves. Thereupon, the sub-cylinder (B') can be pulled out of the guide (11).

In the first embodiment, the sub-cylinder (B) is shown as holding a built-in minus lens (10), while in the second embodiment it holds a built-in plus lens (17). Obviously, however, the sub-cylinders can be reversed, or they can be omitted and appropriate lenses used in the lens holder 1. Any appropriate permutation or combination of lenses in holder 1 and lenses in the sub-cylinder can be used depending on the type of photography it is desired to carry out.

In both the first and second embodiments, when the sub-cylinder is not used and only the main cylinder is mounted on the camera, the main cylinder will serve as a close-range ring for close-range photography.

In these two examples the camera mounting fixture (2) and the lens holder (1) are screw type elements, but alternatively they can be bayonet-joint type elements.

As can be seen from the above description, in the auxiliary cylinder according to the present invention the main cylinder is attached to the camera body.

Long-range photography is carried out by the use of the main cylinder holding a sub-cylinder with a minus lens and wide-angle photography is carried out by the use of the main cylinder holding a sub-cylinder with a plus lens. When only the main cylinder is used, close-range photography can be carried out.

Thus acccording to the present invention, there is no need for three separate auxiliary cylinders each useable for only one of the three kinds of photography. A single main cylinder and two small sub-cylinders, plus appropriate lenses for the lens holder 1 suffice for all three kinds of photography.

Therefore the cost of materials for wide-angle, long-range and close-range photography can be reduced to half that for the conventional equipment.

Use of a single main cylinder for three kinds of photography means a reduction of weight and volume of equipment required for the three kinds of photography, which increases the portability of the equipment.

Variations can be made in the disclosed embodiment of the present invention without departing from the spirit and scope of the invention, which is limited only as set forth in the attached claims.

What is claimed:

1. An auxiliary lens holding cylinder, comprising:
   a main cylinder having a main photography lens holder on one end and a camera mounting fixture on the other end;
   a main photography lens in said main photography lens holder and which is capable of being used by itself for one of a variety of types of photography; and
   a sub-cylinder having a built-in lens for changing the type of photography which can be carried out by said main photography lens to another of a variety of types of photography and which is coaxially removably mounted in said main cylinder and extending into said main cylinder from the other end of said main cylinder, whereby when said auxiliary lens holding cylinder is mounted on a camera, said sub-cylinder is between the camera and said main photography lens.

2. An auxiliary lens holding cylinder as claimed in claim 1 in which said built-in lens is a plus type lens.

3. An auxiliary lens holding cylinder as claimed in claim 1 in which said built-in lens is a minus type lens.

4. An auxiliary lens holding cylinder comprising:
   a main cylinder having a main photography lens holder on one end for removably receiving a main photography lens and having a camera mounting fixture on the other end for removably mounting said main cylinder on a camera;
   a main photography lens in said main photography lens holder and which is capable of being used by itself for one of a variety of types of photography; and
   a sub-cylinder having a built-in lens for changing the type of photography which can be carried out by said main photography lens to another of a variety of types of photography, said main cylinder having cylinder mounting and locking means therein adjacent said other end for receiving and locking said sub-cylinder by a movement of said sub-cylinder coaxially of said cylinder followed by a turning movement of said sub-cylinder around the axis of said main cylinder and release of said sub-cylinder, whereby when said auxiliary lens holding cylinder is mounted on a camera, said sub-cylinder is between the camera and said main photography lens.

5. An auxiliary lens holding cylinder as claimed in claim 4 in which said mounting and locking means is a sub-cylinder holder mounted in said main cylinder coaxial with the main cylinder, guiding and locking means on said sub-cylinder holder for guiding said sub-cylinder into said sub-cylinder holder in a direction parallel with the axis of said main cylinder and locking said sub-cylinder in said sub-cylinder holder, and spring means on said main cylinder for urging said sub-cylinder into locking engagement with said guiding and locking means, and said sub-cylinder has means thereon cooperating with said guiding and locking means by which said sub-cylinder is guided and locked in said sub-cylinder holder.

6. An auxiliary lens holding cylinder as claimed in claim 5 in which said sub-cylinder holder is a cylindrical holder fixedly mounted in said main cylinder and coaxial therewith, said cylindrical holder having at least one guide groove in the inner wall thereof parallel to the axis of said holder and extending toward said lens holder from the direction of said camera mounting fixture, and at least one locking groove spaced circumferentially from said guide groove and in communication therewith and having the end toward said camera mounting fixture closed, and said spring means comprises means for urging said sub-cylinder toward said camera mounting fixture, and said means on said sub-cylinder is a boss engagable in said grooves.

7. An auxiliary lens holding cylinder as claimed in claim 6 in which said cylindrical holder has said guide groove extending from one end to the other and said spring means is engaged with the end of said cylindrical holder toward said lens holder.

* * * * *